United States Patent [19]

Michel et al.

[11] Patent Number: 4,647,629

[45] Date of Patent: Mar. 3, 1987

[54] PROCESS OF CROSS-LINKING A HALOGENATED POLYMER BY MEANS OF A COUPLING AGENT BASED ON THIOLATE

[75] Inventors: Alain Michel, Lyons; Christian Gondard, Roanne, both of France

[73] Assignee: Centre Nationale de la Recherche Scientifique, Paris, France

[21] Appl. No.: 744,996

[22] Filed: Jun. 17, 1985

[30] Foreign Application Priority Data

Jun. 26, 1984 [FR] France ................... 84 10420

[51] Int. Cl.$^4$ ............................................. C08F 8/34
[52] U.S. Cl. ................... 525/350; 525/274; 525/331.5
[58] Field of Search ............ 525/331.5, 331.6, 350, 525/333.4, 366

[56] References Cited

U.S. PATENT DOCUMENTS

| | | | |
|---|---|---|---|
| 3,652,733 | 3/1972 | Davenport . | |
| 3,808,173 | 4/1974 | Orihashi | 525/350 |
| 4,234,705 | 11/1980 | Matoba | 525/329 |
| 4,243,770 | 1/1981 | Tatemoto | 525/350 |

OTHER PUBLICATIONS

Patents Abstracts of Japan, vol. 7, No. 277, "Crosslinkable Paste Vinyl Chloride Resin Composition", Dec. 9, 1983.

*Primary Examiner*—Christopher Henderson
*Attorney, Agent, or Firm*—Parkhurst & Oliff

[57] ABSTRACT

This invention relates to a process of cross-linking a halogenated polymer be nucleophilic substitution of the halogen atoms by means of a coupling agent constituted by an organo-metallic thiolate, wherein said coupling thiolate is an alkaline or alkaline-earth thiolate not comprising an amine function, of general formula:

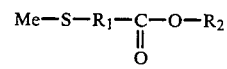

in which:

Me designates an alkaline or alkaline-earth metal;
$R_1$ designates an aliphatic or aromatic radical and;
$R_2$ designates a group selected from the group constituted by:

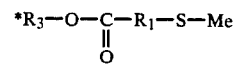

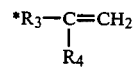

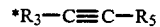

in which $R_3$, $R_4$ and $R_5$ designate an alkyl or aryl group not comprising an amine function.

6 Claims, No Drawings

PROCESS OF CROSS-LINKING A HALOGENATED POLYMER BY MEANS OF A COUPLING AGENT BASED ON THIOLATE

BACKGROUND OF THE INVENTION

The present invention relates to a novel process for cross-linking a halogenated polymer, particularly polyvinyl chloride (PVC) or chlorinated polyethylene, by means of a plurifunctional chemical coupling agent based on thiolate. The present invention also relates to the resins cross-linked in this way.

As is known, cross-linking is an operation intended to join together the chains of a polymer by means of chemical bonds, in order to create a macromolecular network. The consequences of cross-linking a polymer are generally those of considerably modifying its mechanical properties, such as reducing its thermoplasticity and plastic flow, particularly at high temperatures, also of reducing deformation under compressive conditions and finally of improving the resistance to abrasion and the dimensional stability.

In the following specification and claims, the expression "halogenated polymer" designates a polymer comprising

groups, X representing a halogen atom, preferably a chlorine atom. PVC or chlorinated polyethylene may be mentioned by way of example.

Several processes are already known for cross-linking these chlorinated polymers, particularly PVC in the condensed, solid or molten state.

One of these processes known under the name of NAKAMURA and described, for example, in the Journal of Molecular Sciences, Chemistry A (12), 2, 209 (1978), consists in using a coupling agent which is a derivative of triazine, namely dibutyl amino 2, dithiol 4-6 triazine, in the presence of MgO. This coupling agent comprises two thiol functions of equivalent reactivity. Cross-linking of the polymer is thus provoked by interchain chemical reactions bringing about a considerable modification in the viscosity of this polymer, which is hardly compatible with the rheological conditions imposed by the processing operations such as extrusion, injection, but especially calendering. Although this coupling agent may be used in coating processes, it nevertheless provokes a degradation of the polymer associated with the presence of tertiary amines.

In Patents Abstracts of Japan, Vol. 7, No. 277 (C-199) [1422] of Dec. 9, 1983, it was proposed to add to these triazine derivatives hydrated alumina and magnesia carbonates. This process also brings about a degradation of the polymer during the operations of working, particularly by liberation of hydrochloric acid.

U.S. Pat. No. 4,234,705 suggests using as coupling agent a mixture of derivatives of 3,5-dimercapto 1,2,4-triazole comprising amine groups, particularly tertiary amines, and of an acid acceptor based on a metallic compound of groups II or IVa. Unfortunately, the presence of the secondary or tertiary amine functions leads to the same drawbacks as the triazine proposed by NAKAMURA. In fact, it is known that these amines are pro-degrading agents, with the result that the cross-linking effected from coupling agents comprising such functions makes use of double bonds of the halogenated polymer coming from the degradation and not from the nucleophilic substitution of the chlorine atoms.

SUMMARY OF THE INVENTION

The invention overcomes these drawbacks. It relates to a process of cross-linking of halogenated polymers which is easy to carry out, particularly during an operation of working, and in which the reaction of cross-linking is controlled perfectly well. The invention relates more particularly to a process which is adapted to the rheological conditions imposed by the different processes of working of these polymers such as for example injection, extrusion, calendering or coating.

According to the invention, cross-linking of the halogenated polymer is essentially carried out once forming has been effected, so that the viscosity, and consequently the rheological behaviour of the molten halogenated polymer, are not modified.

DETAILED DESCRIPTION OF THE INVENTION

The process of cross-linking according to the invention is essentially based on the nucleophilic substitution of the atoms of halogen, particularly chlorine, with the aid of a specific metallic thiolate and no longer on the double bonds provoked by the degradation associated with the presence of the amine functions, as is the case with the compounds of the prior art mentioned hereinabove.

This process of cross-linking of a halogenated polymer by nucleophilic substitution of the atoms of halogen by means of a coupling agent constituted by an organometallic thiolate, is characterized in that said coupling thiolate is an alkaline or alkaline-earth thiolate not comprising an amine function, of general formula:

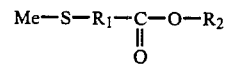

in which:
Me designates an alkaline or alkaline-earth metal,
R$_1$ designates an aliphatic or aromatic radical,
R$_2$ designates a group selected from the group constituted by:

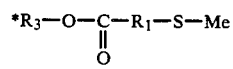

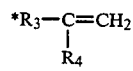

with:
R$_3$ designating an alkyl or aryl group not comprising an amine function but able to comprise ester and/or ether functions;
R$_4$ designates an atom of hydrogen or an alkyl or aryl group not comprising an amine function;
R$_5$ designates an atom of hydrogen or an alkyl or aryl group not comprising an amine function.

In other words, the invention consists in cross-linking a halogenated polymer by nucleophilic substitution of the halogen atoms by means of specific metallic thiolates and no longer, as before, in cross-linking by means of the double bonds provoked by the degradation associated with the amine functions present in the specific thiolates employed. These differences in the modes of action are translated by new and different results, namely the absence of degradation and of instability and the possibility of adapting the chemistry of the cross-linking to the rheological imperatives of the conventional processing.

In this way, when the characteristic thiolates of the invention are incorporated in a formula based on halogenated polymer, particularly PVC, they provoke grafting and cross-linking of this resin during the thermo-mechanical treatments of working, and this in a temperature range which may vary from 80° C. up to temperatures as high as 220°-230° C., at least if the stabilizing system of the formula allows this.

In a first embodiment, the characteristic thiolates of the invention are symmetrical dithiolates. The first thiolate function provokes a grafting by nucleophilic substitution of an atom of chlorine, then simultaneously, the second thiolate function provokes cross-linking of the polymer by the same reaction of substitution of the chlorine atom. These symmetrical dithiolates of general formula:

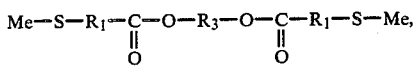

are obtained by duplication from an organic thiol not comprising an amine function, but comprising at least one acid or acid chloride function, with the aid of a reaction of esterification employing a diol and these acid or acid chloride functions.

This reaction of duplication can be effected before the duplicated compound is mixed with the polymer to be cross-linked and, in an advantageous embodiment, duplication is effected in the very presence of this polymer to be cross-linked. This is therefore a duplication effected in situ and advantageously during a processing operation such as an operation of coating, which is novel and particularly economical.

In practice:
the coupling agent is the salt of sodium, barium or potassium of the diester coming from a diol, which may also comprise ether functions such as polyethylene glycol, having reacted with para or ortho mercaptobenzoic acids; synthesis of these symmetrical dithiolates sodium, potassium or barium, i.e. presenting an equivalence of the chemical reactivities of the thiolate functions, may be effected by esterification of the ortho or para mercaptobenzoic acids or their acid chlorides by diols, then by reaction of the diester thus formed, either with sodium hydride for the synthesis of the dithiolates of sodium, or with caustic potash for the synthesis of the dithiolates of potassium, or with barium oxide for the synthesis of the barium dithiolates; with ethylene glycol, compounds of formula:

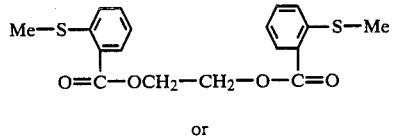

or

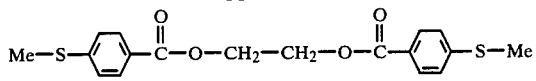

are thus obtained, at least when the metal Me is monovalent (alkaline).

If Me is a divalent metal (alkaline-earth), this atom of metal is bonded to two atoms of sulfur and consequently to at least two molecules.

In a second embodiment, the characteristic thiolates of the invention are monothiolates corresponding to the general formula given hereinabove, obtained from an organic thiol not comprising an amine function, but comprising an acid or acid chloride function, by an esterification reaction with an alcohol comprising at least one vinylic or acetylenic function. In this way, the characteristic thiolate function provokes both a grafting by nucleophilic substitution of the atoms of halogen during processing of the polymer, which thus does not substantially modify the viscosity of this halogenated polymer. The polymer is subsequently, cross linked by thermal or photochemical activation or other form of irradiation.

Advantageously, in practice:
the monothiolate with the vinylic function corresponds to the general formula:

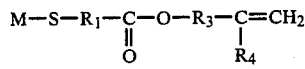

the vinylic function is brought on by an esterification of the monomethacrylate or of the monoacrylate of ethylene glycol;
the compound used is advantageously

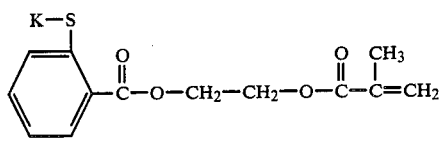

the monothiolate with an acetylenic function corresponds to general formula:

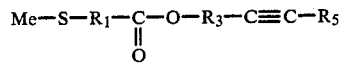

this acetylenic function is brought-on by esterification of the propargylic alcohol;
the coupling agent is the salt of sodium, potassium, barium, the ester of the monomethacrylate or the monoacrylate of ethylene glycol and the ortho or para mercaptobenzoic acids.

In practice, in one or the other of these two embodiments of the invention:
the concentration of the coupling agent in the polymer is generally between 0.1 and 10 pcr; if the concentration is less than 1 pcr, cross-linking is only partial; however, such partial cross-linking may be of interest for certain applications; if, on the other hand, the concentration is greater than 10 pcr, the cost price is increased unnecessarily, without obtaining a proportional improvement in the properties;

the coupling agent is previously dissolved in a solvent with a high boiling point, such as, for example, tetraethylene glycol or, better, in polyethylene glycol 200 or 400, i.e. having a molecular weight close to 200 or 400; such dissolution activates the coupling agent and facilitates dispersion thereof in the resin;

as already stated, the cross-linking operation is effected in condensed, solid or molten phase, during the thermomechanical treatments of processing of the halogenated polymer.

The manner in which the invention may be carried out and the advantages following therefrom will be more readily apparent from the following embodiments given by way of indicative and nonlimiting examples.

In these examples, the efficiency of the cross-linking agents was studied in the laboratory using a Haake plastograph equipped with a kneader with a capacity of 60 g of the Rheomix 600 type. This apparatus makes it possible continuously to follow the development of the torque exerted by the polymer on the blades of the kneader. Cross-linking of the polymer increases the viscosity in the molten state and consequently increases the torque. The variation of the torque $\Delta C$ after gelation is therefore a criterion of cross-linking.

Another criterion chosen in the case of PVC is the rate of insolubilization in tetrahydrofuran at the end of the thermo-mechanical treatment carried out in the Haake plastograph. The insoluble fraction is determined from about one gram of sample placed in tetrahydrofuran. After twelve hours of contact with this solvent, the insoluble polymer is eliminated by filtration. The polymer passed in solution is then precipitated with the aid of methanol, then filtered and dried to constant weight. The rate of insoluble polymer is then determined from this fraction, taking into account the additives initially present in the sample.

Tests of cross-linking of PVC are summarized in Tables I, II and III. They were carried out in the presence of ethyl-2-hexyl phthalate (DOP) as plasticizer and in the presence of thermal stabilizers, such as calcium stearate, zinc stearate, barium octoate and cadmium octoate or a thioglycolate of tin. The cross-linking agents are incorporated in the preceding mixtures in the solid state or after dissolution in tetraethylene glycol or polyethylene glycol 200 or 400. The mixture of the polymer and all the additives is effected by manual kneading cold, then introduced into the kneader previously heated to a temperature of between 140° and 170° C., the speed of rotation of the blades being sixteen revolutions per minute. Once loaded, the kneader is closed and the speed of rotation of the blades is taken to fifty revolutions per minute, whilst the torque and the temperature of the material measured with the aid of a thermocouple located in the kneading chamber are recorded continuously.

The basic plasticized formulae used for the tests with PVC include:

polyvinyl chloride: 45.5 g, viz. 100 phr;
plasticizing agent (DOP): 13.6 g, viz. 30 phr, or 18.2 g, viz. 40 phr.

Tables I, II and III hereinbelow summarize the experimental conditions of the tests carried out in a Haake kneader and show the efficacy of the dithiolates with respect to the cross-linking of the polyvinyl chloride assessed, on the one hand, by the variation of the torque $\Delta C$ between the minimum moment observed after gelation of the mixture, when the latter is not produced at the same time as cross-linking, and the maximum torque ($C_{max}$) attained at the end of the experiment, and, on the other hand, by the rate of insolubilization of the polymer in tetrahydrofuran at the end of the tests.

Also shown in the Tables is the time $T_{RI}$ at the end of which the increase of the torque appears, therefore a beginning of significant cross-linking and the maximum temperature $\theta_{max}$ attained by the material at the end of the experiment.

The results shown in the Tables enable the following conclusions to be drawn:

the dithiolates of sodium, potassium or barium, such as the diesters of ethylene glycol of the para or ortho mercaptobenzoic acids, present equivalent reactivities for the cross-linking of PVC (Tables I and II);

in the absence of solvent, the higher the concentration of a coupling agent, the more rapidly cross-linking occurs;

prior dissolution in a solvent with a high boiling point, such as tetraethylene glycol or preferably polyethylene glycols with molecular weight of between 200 and 400, accelerates cross-linking, even at concentrations as low as 1 or 2 phr (cf. tests 4 and 5 and 9 to 12);

the para compounds act more rapidly than the ortho compounds, and they may bring about cross-linking of the PVC at the same time as the gelation takes place (tests 4 and 5);

these cross-linking agents seem to be well adapted to the process of working by coating in which gelation and fusion are produced once the objects have been elaborated.

TABLE I

CROSS-LINKING OF PVC BY THE SODIUM DITHIOLATES OF THE ORTHO OR PARA DIBENZOATE OF ETHYLENE GLYCOL (DOP = 30 phr)

| Examples | Dithiolate phr | Tetraethylene glycol phr | Stabilizing system Ca phr | Stabilizing system Zn phr | Temperature displayed °C. | Duration min. | $T_{RI}$ min. | $C_{max}$ N.m | $\Delta C$ N.m | $\theta_{max}$ °C. | % insoluble |
|---|---|---|---|---|---|---|---|---|---|---|---|
| 1 | 9.5 | 0 | 2 | 0 | 150 | 8 | 3 | 48.1 | 15.7 | 184 | 61 |
| 2 | 10 | 0 | 2 | 1 | 150 | 11 | 6 | 52.0 | 23.05 | 184 | 65 |
| 3 | 5 | 0 | 2 | 1 | 150 | 15 | 9 | 43.2 | 19.15 | 178 | 65 |
| 4 | 1 | 4.5 | 2 | 0 | 150 | 3.5 | 2 | 38.8 | 0.34 | 182 | 50.5 |
| 5* | 1 | 4.5 | 1 | 0 | 150 | 9 | — | 39.2 | — | 179 | 54 |
| 6* | 5 | 0 | — | — | 150 | 26 | 9 | 32.9 | 15.20 | 179 | 46 |

5*: test carried out with the dithiolate of para dibenzoate of ethylene glycol
6*: here, the stabilizing system Ca—Zn has been replaced by a stabilizing system based on tin (trithioglycolate of tin butyl)

TABLE II

CROSS-LINKING OF PVC BY THE POTASSIUM DITHIOLATES OF THE ORTHO DIBENZOATE OF ETHYLENE GLYCOL (DOP = 40 phr)

| Examples | Dithiolate phr | Polyethylene glycol 200 phr | Stabilizing system | | Temperature displayed °C. | Duration min. | $T_{RI}$ min. | $C_{max}$ N.m | $\Delta C$ N.m | $\theta_{max}$ °C. | % insoluble |
|---|---|---|---|---|---|---|---|---|---|---|---|
| | | | Ca phr | Zn phr | | | | | | | |
| 7 | 5 | 0 | 2 | 0 | 150 | 5 | 3.5 | 44.1 | 11.30 | 172 | 60 |
| 8 | 10 | 0 | 2 | 0 | 150 | 9 | 6 | 35.3 | 10.81 | 192 | 65 |
| 9 | 2 | 4.5 | 1 | 1 | 150 | 4.5 | 2 | 27.5 | 3.90 | 170 | 64 |
| 10 | 2 | 6.5 | 1 | 1 | 140 | 6 | 2 | 30.4 | 5.40 | 165 | 88.5 |
| 11 | 2 | 11 | 1 | 1 | 140 | 7 | 0.5 | 30.4 | 14.7 | 165 | 85 |
| 12 | 2 | 11 | 1 | 1 | 160 | 4 | 1 | 24.5 | 3.90 | 170 | 77 |

TABLE III

CROSS-LINKING OF PVC BY THE BARIUM DITHIOLATES OF THE ORTHO DIBENZOATE OF ETHYLENE GLYCOL (DOP = 40 phr)

| Examples | Dithiolate phr | Polyethylene Glycol 200 phr | Stabilizing system | | Temperature displayed °C. | Duration min. | $T_{RI}$ min. | $C_{max}$ N.m | $\Delta C$ N.m | $\theta_{max}$ °C. | % insoluble |
|---|---|---|---|---|---|---|---|---|---|---|---|
| | | | Ba phr | Cd phr | | | | | | | |
| 13 | 3 | 6.5 | 1 | 1 | 160 | 5 | 2 | 26.5 | 8.8 | 170 | 81 |
| 14 | 4 | 9 | 1.5 | 1.5 | 160 | 6.5 | 2.5 | 24.5 | 8.8 | 178 | 90 |
| 15 | 3 | 6.5 | 1 | 1 | 150 | 6 | 2.5 | 28.5 | 8.8 | 166 | 85 |

EXAMPLE 16

By esterification of the ortho thiosalicylic acid with the aid of hydroxyethyl methacrylate, the difunctional agent of formula:

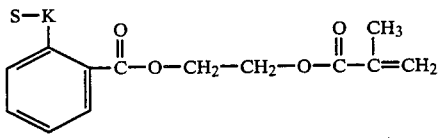

is produced.

This compound is grafted on the PVC during a thermomechanical treatment in a kneader of the haake type at 140° C. without bringing about cross-linking of the polymer. On the other hand, the PVC thus grafted and put in the form of a film 0.5 mm thick using a Lescuyer Villeneuve press or a rolling mill of the Scamia type, is cross-linked when it is subjected to UV radiation using a Wallas Knight lamp of 80 Watts and whose maximum wave length is 360 mm.

The basic formulation used for this example is:

| polyvinyl chloride | 45.5 g |
|---|---|
| ethyl 2 hexyl phthalate | 18.2 g |
| zinc stearate | 0.45 g |
| calcium stearate | 0.45 g |
| potassium salt of the metathacrylate of ethylene glycol ortho mercapto benzoate | 2.27 g |
| polyethylene glycol of average molar weight 200 | 10 ml |

After mixing in the Haake kneader for six minutes, 57% of the difunctional agent is grafted on the polymer.

After exposure to ultra-violet radiation for four or twelve seconds, the rate of insoluble polymer is 51%.

EXAMPLE 17

The following basic formulation is used:

| PVC | 45.5 g |
|---|---|
| ethyl 2 hexyl phthalate | 18 g |
| barium octoate | 0.45 g |
| cadmium octoate | 0.45 g |
| polyethylene glycol with an average molar weight of 200 | 1 ml |

After mixing in the Haake kneader at 170° C. for nine minutes, the rate of insoluble polymer in the tetrahydrofuran is 85%. The increase of torque $\Delta C$ after gelation is 4.9 N.m and the $\theta_{max}$ attained by the material at the end of the experiment is 180° C.

In this way, the barium salts of the compounds derived from the esters of the ortho or para mercaptobenzoic acids make it possible to obtain by trans-esterification in situ a rate of cross-linking equivalent to that of tests 1 to 15.

EXAMPLE 18

Under the same conditions as Example 17, the following are mixed:

| PVC | 100 phr |
|---|---|
| dioctyl phthalate (DOP) | 40 phr |
| liquid Ba/Cd stabilizing agent | 2 phr |
| stearine | 0.5 phr |
| propylene glycol with a molar mass of 425 | 6 phr |
| barium salt of thiosalycilic acid (coupling agent) | 0.5 phr |

As in Example 17, the coupling agent is duplicated in situ by esterification but not by trans-esterification.

After six and a half minutes of mixing, the rate of insoluble polymer in the tetrahydrofuran is 99%, the TRI is two minutes, the increase of torque $\Delta C$ is 12.7 N.m and the $\theta_{max}$ is 194° C.

EXAMPLE 19

Under the same conditions as Example 17, the following mixture is employed:

| chlorinated polyethylene containing 42% of chlorine by weight | 100 phr |
|---|---|

| | |
|---|---|
| liquid Ba/Cd stabilizing agent | 2 phr |
| stearine | 0.5 phr |
| polypropylene glycol with a molar weight of 425 | 10 phr |
| barium salt of thiosalycilic acid | 5 phr |

After four minutes of mixing, a cross-linked polymer is obtained. The TRI is one and a half minutes, the $\Delta C$ is 12.7 N.m and the temperature $\theta_{max}$ is 190° C.

The process of cross-linking according to the invention presents numerous advantages over the heretofore known processes. For example:

the adaptability of the chemistry of cross-linking to the rheological imperatives imposed by the different thermo-mechanical processing existing, such as calendering, coating, extrusion and injection, which is probably due to the fact that one acts by nucleophilic substitution of the atoms of chlorine and not by radical reaction;

compatibility with the polymer of the coupling agents such as worked.

Consequently, the halogenated polymers cross-linked in this way may be used successfully in applications where a good dimensional stability and a noteworthy reduction of the thermoplasticity, particularly at high temperatures, are sought.

What is claimed is:

1. A process of cross-linking polyvinyl chloride by nucleophilic substitution of the halogen atoms by means of a coupling agent, said coupling agent comprising a symmetrical dithiolate of the general formula:

$$Me-S-R_1-\underset{\underset{O}{\|}}{C}-O-R_3-O-\underset{\underset{O}{\|}}{C}-R_1-S-Me$$

wherein:
Me designates an alkaline or alkaline-earth metal;
$R_1$ designates an aliphatic or aromatic radical; and
$R_3$ designates an alkyl or aryl group not comprising an amine function but able to comprise at least one of an ester and ether functions.

2. The process of claim 1, wherein:
said coupling agent has a concentration of between 0.1 and 10 phr; and
said cross-linking is effected during thermomechanical processing of said polyvinyl chloride.

3. The process of claim 1, wherein said symmetrical thiolate is obtained by duplication from an organic thiol not comprising an amine function, but comprising at least one acid or acid chloride function, with the aid of a reaction of esterification employing a diol and these acid or acid chloride functions.

4. The process of claim 1, wherein the acid or acid chloride function is ortho or para mercaptobenzoic acid.

5. The process of claim 3, wherein duplication is effected in situ in the very mixture comprising the halogenated polymer to be cross-linked and during a thermo-mechanical operation of coating of this polymer.

6. The process of claim 1, wherein:
said coupling agent is dissolved previously in a solvent with a high boiling point; and
said cross-linking is effected during thermomechanical processing of said polyvinyl chloride.

* * * * *